United States Patent
Simmet et al.

(10) Patent No.: US 7,540,321 B2
(45) Date of Patent: Jun. 2, 2009

(54) AIR CONDITIONER FOR VEHICLE

(75) Inventors: Wolfgang Simmet, Haar (DE); Kenji Matsui, Munich (DE); Kotaro Suda, Chita-gun (JP)

(73) Assignees: DENSO CORPORATION, Kariya (JP); DENSO Automotive Deutschland GmbH, Eching (DE)

( * ) Notice: Subject to any disclaimer, the term of this patent is extended or adjusted under 35 U.S.C. 154(b) by 668 days.

(21) Appl. No.: 11/147,129

(22) Filed: Jun. 7, 2005

(65) Prior Publication Data

US 2005/0269071 A1     Dec. 8, 2005

(30) Foreign Application Priority Data

Jun. 7, 2004   (DE) .................... 10 2004 027 689

(51) Int. Cl.
*B60H 1/00*   (2006.01)

(52) U.S. Cl. ............................ 165/203; 165/42; 165/43; 165/103; 454/121; 454/126; 454/156; 454/160; 454/161; 237/12.3 A; 237/12.3 B

(58) Field of Classification Search ................ 165/203, 165/42, 43, 103; 454/121, 126, 160, 161, 454/156; 237/12.3 A, 12.3 B
See application file for complete search history.

(56) References Cited

U.S. PATENT DOCUMENTS

| | | | |
|---|---|---|---|
| 5,154,223 A | 10/1992 | Ishimaru et al. | |
| 5,653,630 A | 8/1997 | Higashihara | |
| 6,045,444 A * | 4/2000 | Zima et al. | 454/121 |
| 6,048,263 A | 4/2000 | Uchida et al. | |
| 6,293,339 B1 | 9/2001 | Uemura et al. | |

FOREIGN PATENT DOCUMENTS

| | | |
|---|---|---|
| EP | 0 968 857 | 1/2000 |
| JP | 58164417 A * | 9/1983 |

* cited by examiner

*Primary Examiner*—John K Ford
(74) *Attorney, Agent, or Firm*—Harness, Dickey & Pierce, PLC

(57) ABSTRACT

An air conditioner for a vehicle includes a housing for defining an air passage, and the air passage has a main passage and first and second separate passages branched from the main passage. The first separate passage is provided for leading air from the main passage to a front area of a passenger compartment, and the second separate passage is provided for leading air from the main passage to a rear area of the passenger compartment. Furthermore, an evaporator is disposed in the main passage of the housing, and a heat exchanger is disposed in the main passage at a downstream air side of the evaporator in a part area of the main passage. In the air conditioner, a control member is provided to adjust an air flow from the evaporator into the first separate passage and an air flow from the heating heat exchanger into the first separate passage.

16 Claims, 7 Drawing Sheets

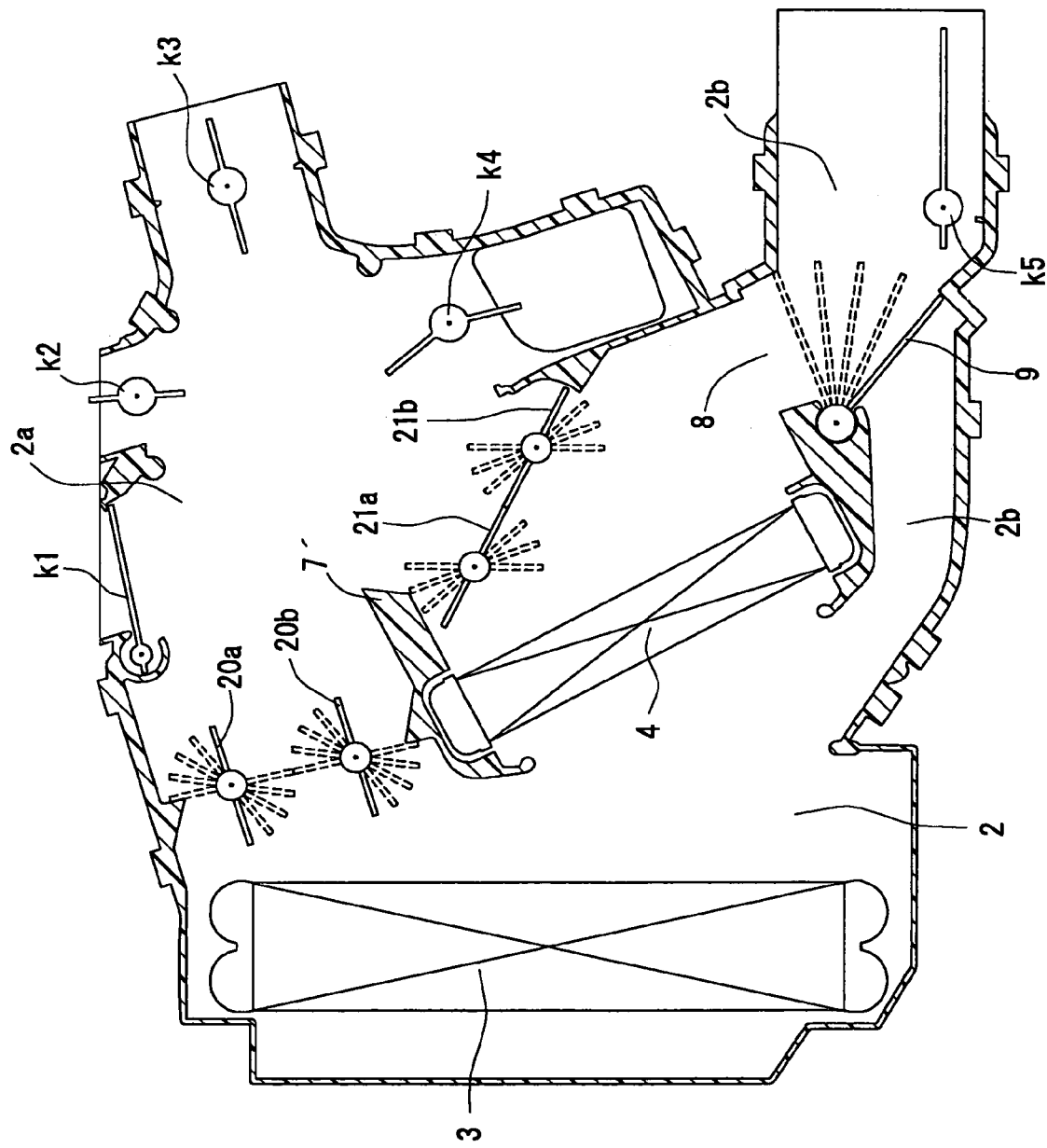

AIR CONDITIONER FOR VEHICLE

CROSS REFERENCE TO RELATED APPLICATION

This application is based on German Patent Application No. 102004027689.7 filed on Jun. 7, 2004, the contents of which are incorporated herein by reference in its entirety.

FIELD OF THE INVENTION

The present invention relates to an air conditioner for a vehicle, in which temperature of air supplied to a passenger compartment of the vehicle is adjusted by mixing cold air and warm air.

BACKGROUND OF THE INVENTION

In an air conditioner, it is known to provide flap-shaped air mixing members (control flaps) between an evaporator which cools air passing therethrough, and a heating heat exchanger (e.g., heater core) which heats air passing therethrough. By adjusting the operation positions of the control flaps, the cold air from the evaporator and the warm air from the heating heat exchanger are mixed to have a desired temperature before air is supplied to a passenger compartment. In this case, the flow directions of the cold air and warm air relative to one another are changed according to the adjustment of the control flaps, so that conditioned air having different conditions (e.g., temperature) can be obtained. Further, due to the arrangement of the control flaps between the evaporator and the heating heat exchanger, it is difficult to set very different temperature ranges in the front and rear areas of the passenger compartment.

SUMMARY OF THE INVENTION

In view of the above-described problems, it is an object of the present invention to provide a vehicle air conditioner, which can set very different temperature ranges for first and second areas (e.g., front and rear areas) of a passenger compartment.

It is another object of the present invention to provide a vehicle air conditioner, which can set very different temperature ranges for front and rear areas of a passenger compartment while simplifying its structure and improving air mixing performance.

According to an aspect of the present invention, a vehicle air conditioner includes a housing for defining an air passage through which air flows, and the air passage has a main passage and first and second separate passages branched from the main passage. The first separate passage is provided for leading air from the main passage to a front area of a passenger compartment, and the second passage is provided for leading air from the main passage to a rear area of the passenger compartment. In the air conditioner, an evaporator for cooling air is disposed in the main passage of the housing, and a heat exchanger for heating air is disposed in the main passage at a downstream air side of the evaporator in a part area of the main passage. Furthermore, a control member is provided to adjust an air flow from the evaporator into the first separate passage and an air flow from the heating heat exchanger into the first separate passage leading to the front area of the passenger compartment. Therefore, the air conditioning for the front area of the passenger compartment can be performed with a simple structure.

For example, a limiting wall member is provided to extend from an upper end of the evaporator to a lower end of the heat exchanger approximately in an arc shape at a distance from the heat exchanger on a downstream air side of the heat exchanger. In this case, the limiting wall member is separated from the lower end of the heat exchanger to have a rear opening between the lower end of the heat exchanger and the limiting wall member, through which air from the heat exchanger flows into the second separate passage leading to the rear area. Furthermore, the limiting wall member is provided to partition the first separate passage from the main passage, and the control member is arranged in the limiting wall member.

Preferably, a partition plate is provided for partitioning the main passage into a cold air passage through which air from the evaporator flows to the first separate passage, and a warm air passage through which air from the heat exchanger flows. Furthermore, the control member is a flexible sheet member having a through hole, the limiting wall member has a guide member for guiding the sheet member, the partition plate extends from an end portion of the heat exchanger to a position immediately before the limiting wall member, and the sheet member is displaceable along the limiting wall member in the guide member relative to the partition plate.

Accordingly, cold air from the evaporator and warm air from the heat exchanger flow undisturbed to the control member, and the two airstreams are mixed directly before entering the first separate passage leading to the front area of the passenger compartment. For example, maximum cold air supply can be set for the front area of the passenger compartment and maximum warm air supply can be set for the rear area of the passenger compartment. In addition, by using the flexible sheet member provided with the through hole as the control member for the front area, it is possible to independently set a mixing ratio of the cold and warm air in a through hole approximately at the same angle of flow. Thus, mixing between the cold air and warm air can be performed in a narrow space with a simple structure.

As an example, the sheet member can be constructed with two sheet portions which are displaceable relative to one another. In this case, an open area of the through hole is adjustable by the two sheet portions. Furthermore, a control flap can be arranged to open and close the rear opening to adjust a flow amount of air flowing from the heat exchanger into the second separate passage.

Alternatively, the control member can be constructed with at least one first control element which is arranged between an end of the heat exchanger and a limiting wall of the housing for adjusting an air amount flowing from the evaporator to the first separate passage, and at least one second control element arranged at a downstream air side of the heat exchanger for adjusting an air amount flowing from the heat exchanger to the first separate passage.

According to another aspect of the present invention, an opening portion is provided in the housing, for mixing air from the evaporator and air from the heat exchanger. Here, the main passage communicates with the first separate passage through the opening portion. Furthermore, temperature adjusting means is provided for adjusting a temperature of air mixed in the opening portion by adjusting a first open area of the opening portion for passing air from the evaporator into the opening portion, and a second open area of the opening portion for passing air from the heating heat exchanger into the opening portion.

For example, the temperature adjusting means is constructed with a partition plate extending from an end of the heat exchanger to a portion immediately before the opening portion, and a moving unit for moving the opening portion relative to the partition plate. Furthermore, a sheet member having the opening portion can be provided.

BRIEF DESCRIPTION OF THE DRAWINGS

The above and other objects, features and advantages of the present invention will become more apparent from the following detailed description of exemplary embodiments made with reference to the accompanying drawings, in which:

FIG. 7 is a schematic cross-sectional view of an air conditioner for a vehicle according to a second exemplary embodiment of the present invention.

DETAILED DESCRIPTION OF EXEMPLARY EMBODIMENTS

First Embodiment

Figure 1:
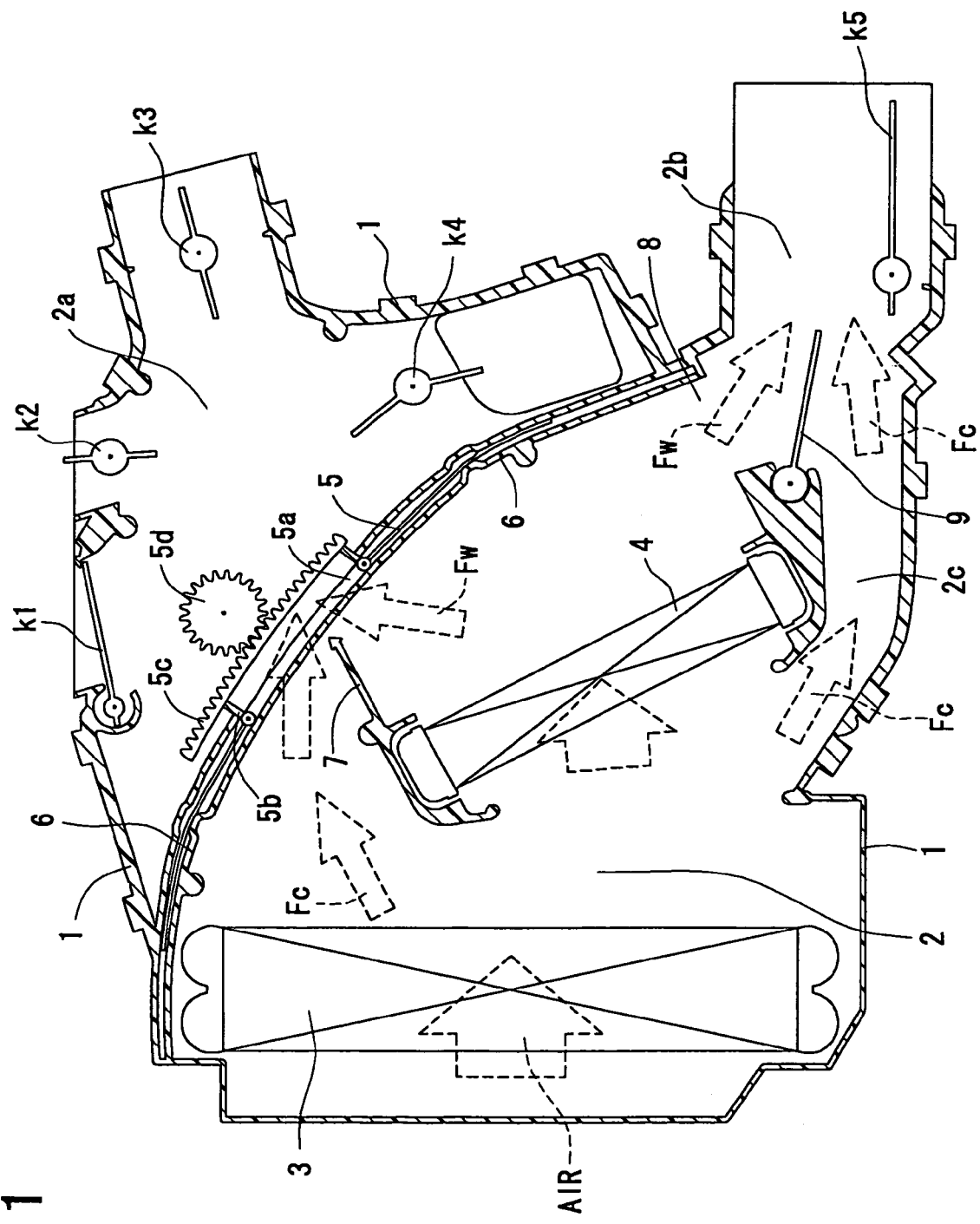
FIG. 1 is a schematic cross-sectional view of an air conditioner for a vehicle according to a first exemplary embodiment of the present invention.

As shown in FIG. 1, an air conditioner housing 1 defines an air passage through which air flows into a passenger compartment of a vehicle. The air passage of the air conditioner housing 1 includes a main passage 2 (upstream air passage) in which an evaporator 3 and a heating heat exchanger 4 (heater core) are arranged. The evaporator 3 for cooling air is disposed at a most upstream air portion in the main passage 2, and the heating heat exchanger 4 for heating air is disposed in the main passage 2 so that a part of cold air flowing from the evaporator 3 is heated in the heating heat exchanger 4. The air conditioner housing 1 can be made of a resinous material, for example.

A flexible sheet member 5 (flexible film member) having a through hole 5a is arranged at a downstream air side of the heating heat exchanger 4 to have a distance from the heating heat exchanger 4. A first separate passage 2a is provided downstream from the flexible sheet member 5 and is branched from the main passage 2. Air from the main passage 2 flows into the first separate passage 2a through the through hole 5a of the flexible sheet member 5.

As shown in FIG. 1, different control flaps K1-K4 (e.g., plate doors) are provided in the first separate passage 2a and are attached to the housing 1. The flaps K1 and K2 are provided for opening and closing an air outlet near a windscreen (windshield), the flap K3 is provided for opening and closing an air outlet through which conditioned air is blown toward the face area of a passenger on front seats of the passenger compartment, and the flap K4 is provided for opening and closing an air outlet through which conditioned air is blown toward the foot area of a passenger on the front seats of the passenger compartment.

A rear bypass passage 2c through which cold air from the evaporator 3 bypasses the heating heat exchanger 4 is provided at a lower side of the heating heat exchanger 4 in the housing 1. Air passing through the rear bypass passage 2c is supplied to a rear area in the passenger compartment through a second separate passage 2b and a rear duct connected to the second separate passage 2b. For example, through the second separate passage 2b, conditioned air flows toward the foot area and/or the face area of a passenger in a rear seat of the passenger compartment. Further, a control flap K5 (e.g., plate door) is provided in the second separate passage 2b to open and close the second separate passage 2b.

The heat exchanger 4 is arranged in the main passage 2 at a distance from the vertically arranged evaporator 3 and inclined slightly towards the evaporator 3 from a vertical line. The flexible sheet member 5 extends approximately in an arc from an upper end of the evaporator 3 to a lower end of the heating heat exchanger 4 at a downstream air side of the heating heat exchanger 4. The flexible sheet member 5 is separated from the heating heat exchanger 4 by a distance on a downstream air side of the heating heat exchanger 4. A guide member 6 for guiding the flexible sheet member 5 is disposed. The through hole 5a can be surrounded by a frame 5b. A displacing unit, for example, a toothed rack 5c is joined to the sheet member 5 and is engaged with a toothed wheel 5d, so that the sheet member 5 can be displaced along the guide member 6. The guide member 6 and the sheet member 5 together form an approximate arc-shaped limiting wall of the main passage 2.

A partition wall 7 (partition plate) extends from an upper end of the heat exchanger 4 toward the flexible sheet member 5. Because the partition wall 7 is formed, the cold air stream is separated from the warm air stream in the area adjacent to the sheet member 5. The warm air stream is indicated by arrows Fw, and the cold air stream is indicated by arrows Fc in FIG. 1. Between the lower end of the heat exchanger 4 and the lower end of the guide member 6, a rear warm air port 8 is formed. Through the rear warm air port 8, the warm air stream Fw is supplied to the separate passage 2b. A control flap 9 is provided at a position proximate to the rear warm air port 8 to open and close the rear warm air port 8 and the rear bypass passage 2c. When the control flap 9 is positioned at a middle position as shown in FIG. 1, the warm air from the heating heat exchanger 4 and cold air from the rear bypass passage 2c are mixed in the second separate passage 2b, and is supplied to the rear area of the passenger compartment through the second separate passage 2b.

The partition wall 7 at the upper end of the heat exchanger 4 extends to a position immediately before the plane of the sheet member 5. At the position of the through hole 5a relative to the partition wall 7 in FIG. 1, the through hole 5a is divided by the partition wall 7 into two approximately equally large partial openings for the cold air and the warm air, so that a mixing ratio of 50% cold air to 50% warm air can be obtained for the air conditioning of the front area of the passenger compartment.

As shown in FIG. 1, the two air streams Fc and Fw meet in the area of the through hole 5a at an angle of approximately 90°, so that cold air and warm air can be effectively and sufficiently mixed in a narrow space. In this embodiment, a limiting wall of the main passage 2 is constructed with the guide member 6 and the sheet member 5. That is, the first separate passage 2a is partitioned from the main passage 2 by the limiting wall. The limiting wall forms an acute angle with the partition wall 7 on the side of the cold air stream Fc, while forming an obtuse angle with the limiting wall on the side of the warm air stream Fw.

Figure 2:
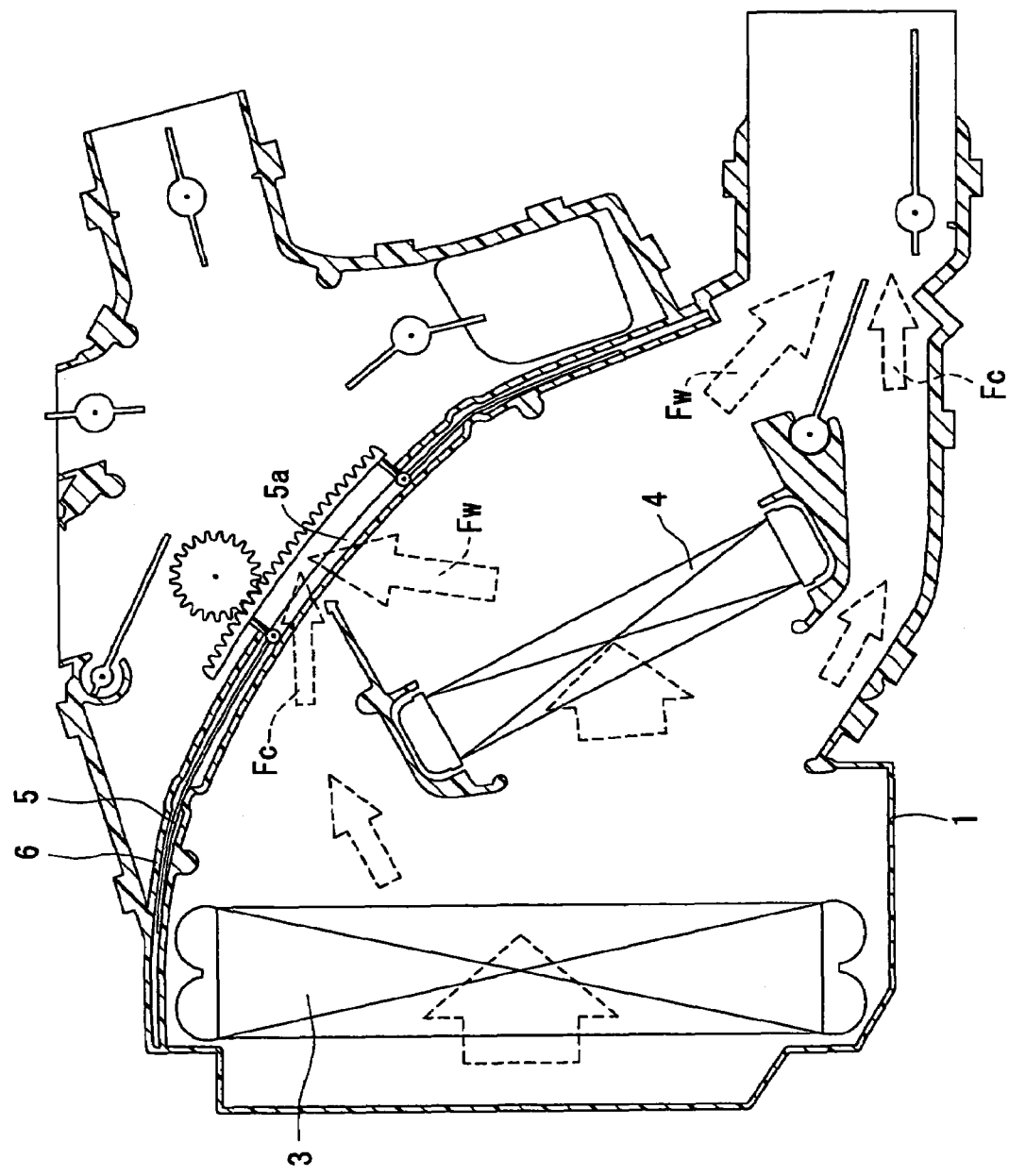
FIGS. 2-5 are schematic cross-sectional views showing different operation modes in the air conditioner of FIG. 1.

FIG. 2 shows a position of the sheet member 5 in which the through hole 5a is divided by the stationary partition wall 7 approximately by the ratio of 30:70, so that approximately 30% of cold air and 70% of warm air flow through the through hole 5a. As shown in FIG. 2, the contact angle of the two airstreams Fc and Fw does not change substantially, so that air mixing performance can be improved even when the air mixing ratio is changed.

Figure 3:
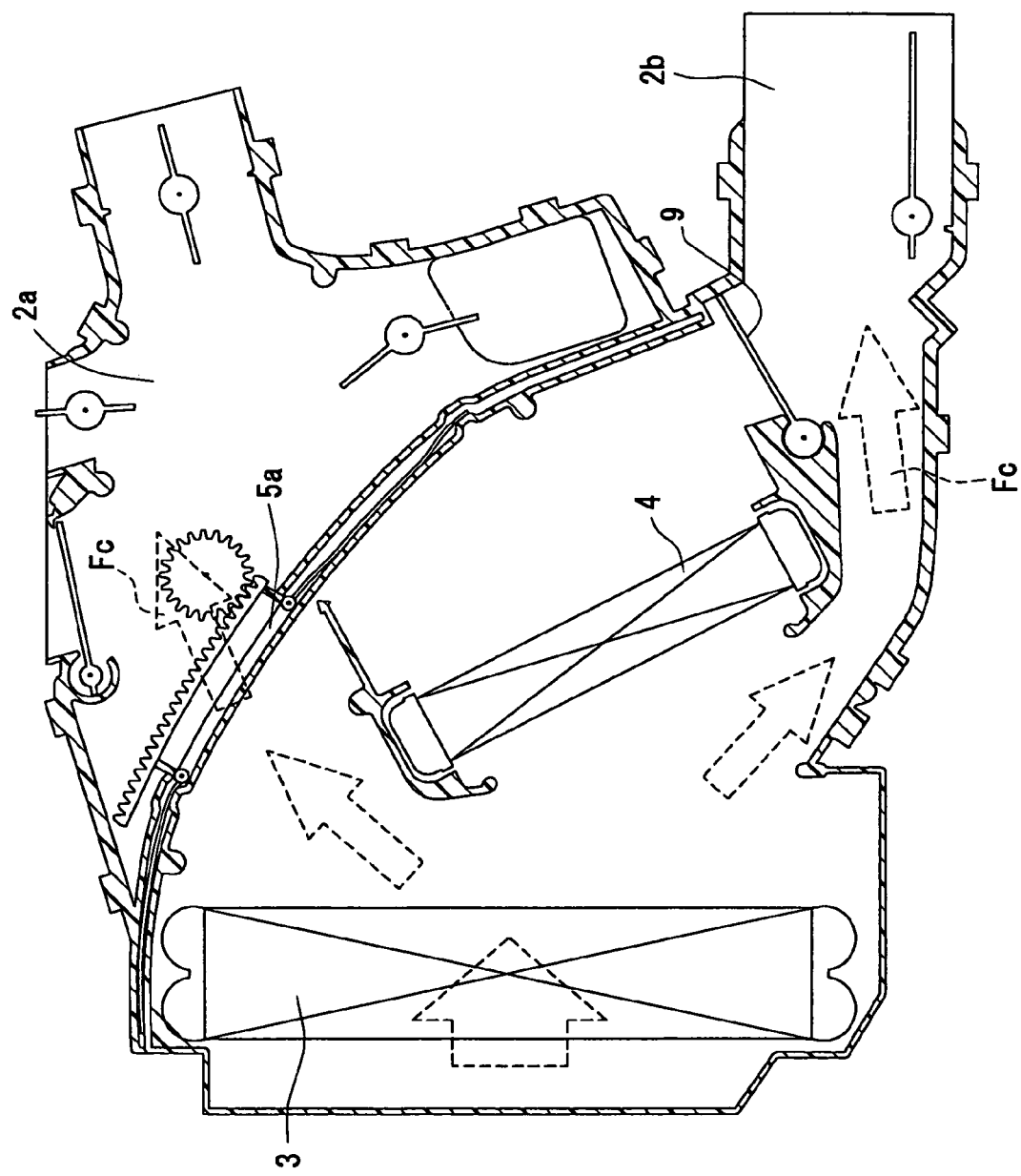
Figure 5:
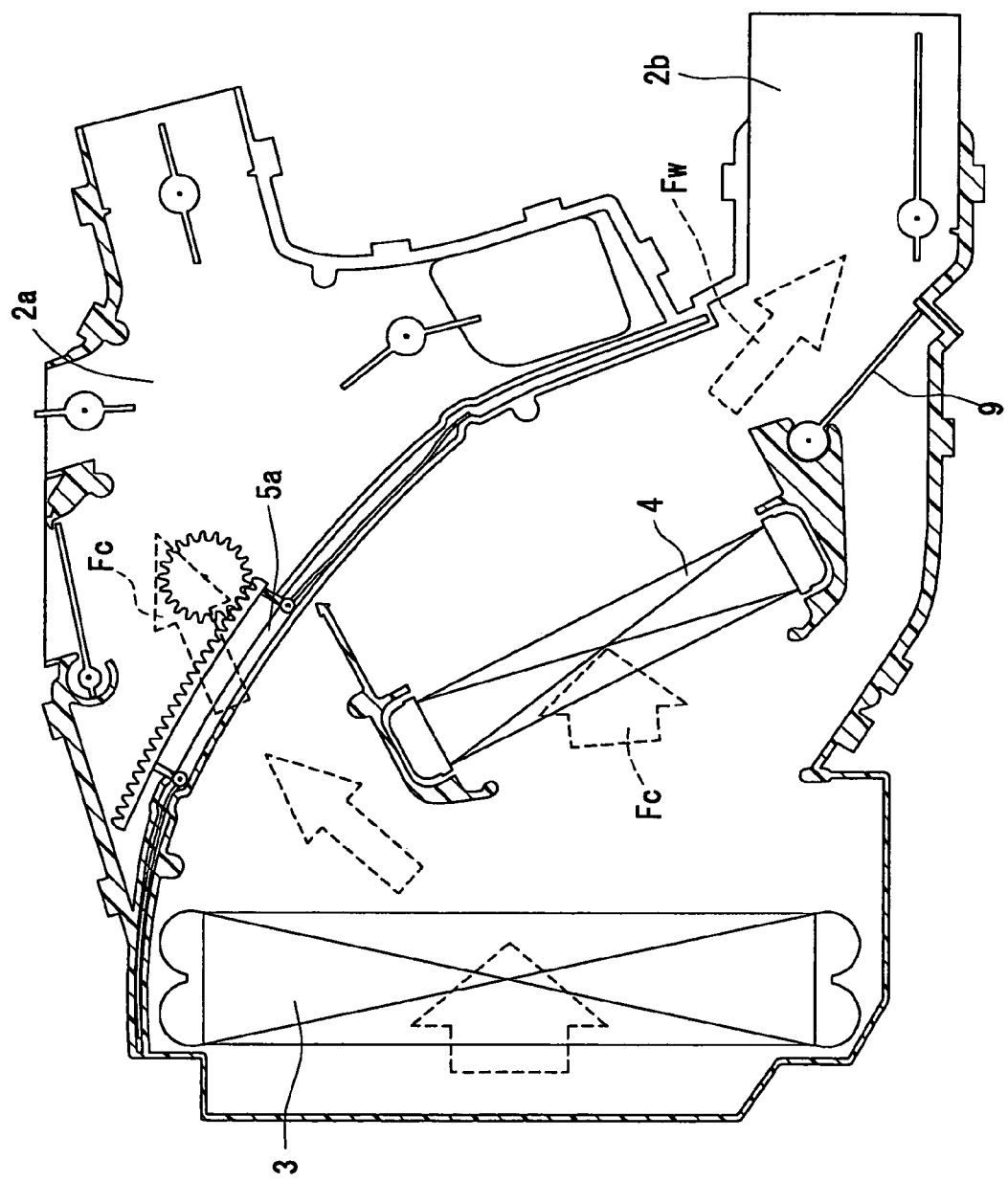

FIG. 3 shows a maximum cooling mode for the front area and the rear area of the passenger compartment. In the maximum cooling mode shown in FIG. 3, only cold air flows through the through hole 5a, and the control flap 9 is operated so that only the cold air flows to the rear area of the passenger compartment through the second separate passage 2b. The air outlet at the heat exchanger 4 is hereby closed in the maximum cooling mode of FIG. 3. If the control flap 9 is shifted to the position of FIG. 5 in the state of FIG. 3, only warm air from the heat exchanger 4 can enter the rear area of the passenger compartment through the second separate passage 2b while cold air is supplied to the front area in the passenger compartment through the first separate passage 2b, as shown in FIG. 5. Therefore, in the operation mode of FIG. 5, a maximum heating mode can be set for the rear area of the passenger compartment, while a maximum cooling mode can be set for the front area of the passenger compartment.

Figure 4:
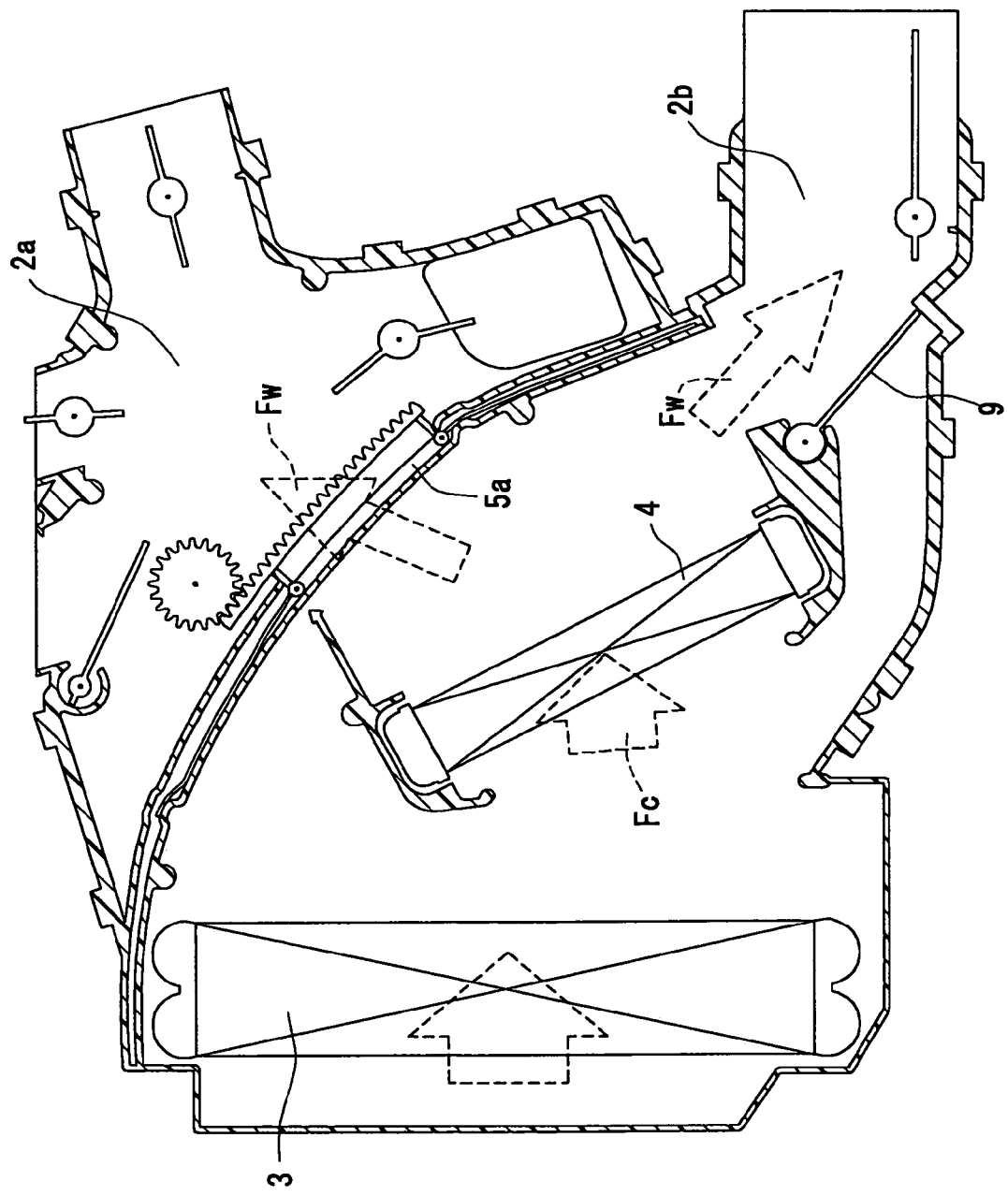

FIG. 4 shows a maximum heating mode for the front area and the rear area of the passenger compartment. In the maximum heating mode shown in FIG. 4, only warm air flows through the through hole 5a, and the control flap 9 is operated so that only the warm air flows to the rear area of the passenger compartment through the second separate passage 2b. In the maximum heating mode, all air from the evaporator 3 passes through the heating heat exchanger 4 and flows toward the front area and the rear area of the passenger compartment.

In this embodiment, very different temperature ranges can be set independently for the front and rear areas of the passenger compartment. In the second separate passage 2b for the rear area of the passenger compartment, a simple flap 9 can be used as shown in FIG. 1 because the cold air and warm air can be sufficiently mixed due to the length of the separate passage 2b and the rear duct. On the other hand, for performing the front air-conditioning of the passenger compartment, the cold air from the evaporator 3 and the warm air from the heating heat exchanger 4 can be sufficiently mixed in a very narrow space by using the through hole 5a of the flexible sheet member 5.

Figure 6:
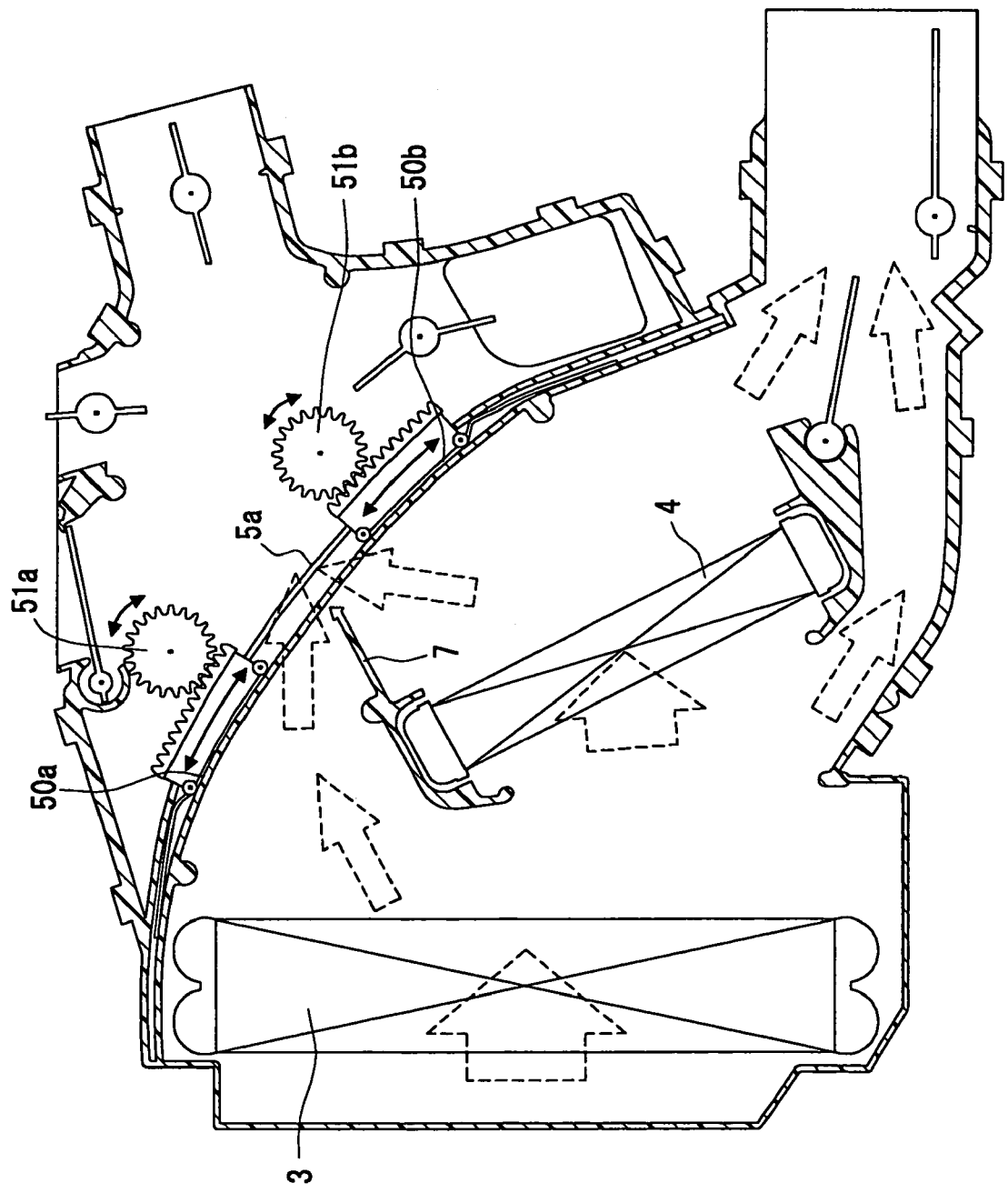
FIG. 6 is a schematic cross-sectional view of an air conditioner for a vehicle according to a modification of the first exemplary embodiment of the present invention.

FIG. 6 shows a modified embodiment in which two separate flexible sheet members 50a and 50b (film members) are provided as control slidable members which are displaceable relative to one another. For example, the sheet members 50a and 50b are moved along toothed rails mounted on the sheet members 50a and 50b by operation of toothed wheel 51a and 51b, to set an open area (size) of the through hole 5a. Accordingly, it is possible to suitably set an air-mixing ratio between the cold air and the warm air, for the front area of the passenger compartment.

In this example shown in FIG. 6, because two separate sheet members 50a and 50b are used as displacing means, the size of the through hole 5a can be suitably set. For example, by displacing the two sheet members 50a and 50b together by the same amount in one direction, the whole position of the through hole 5a can be relocated along the arc-shaped limiting wall relative to the partition wall 7. In addition, it is also possible to change only the size of the through hole 5a by moving at least one of the two sheet members 50a and 50b along the guide member 6. Therefore, an open area of the through hole 5a, into which cold air from the evaporator 3 flows, and an open area of the through hole 5a, into which warm air from the heat exchanger 4 flows, are changed by movement of the through hole 5a relative to the partition wall 7. The two sheet members 50a and 50b can be moved together by using a displacement unit or can be moved independently by using separate displacement units.

Second Embodiment

Instead of the flexible sheet member 5 or 50a, 50b, other control members can also be used to set very different temperatures in the front or rear area independently of one another. FIG. 7 shows an example having control flaps 20a, 20b for the cold air stream and control flaps 21a, 21b for the warm air stream, instead of the flexible sheet member 5 or 50a, 50b. As shown in FIG. 7, the two control flaps 20a and 20b are arranged between the upper end of the heating heat exchanger 4 and an upper wall portion of the housing 1. By using the two control flaps 20a and 20b, an amount of cold air flowing from the cold air passage into the separate passage 2a leading to the front area of the passenger compartment is adjusted. Further, the two control flaps 21a and 21b are arranged between a partition wall 7' at the upper end of the heat exchanger 4 and a housing wall, so as to adjust a flow amount of warm air from the heating heat exchanger 4 into the first separate passage 2a. At the lower end of the heat exchanger 4, a rear warm air port 8 is provided. The air port 8 communicates with the second separate passage 2b leading to the rear area of the passenger compartment. When the control flaps 20a, 20b, 21a, 21b are positioned at the solid line position in FIG. 7, a maximum cooling mode can be set for the front area of the passenger compartment. The control flaps 20a, 20b, 21a, 21b can be moved to the chain line positions shown in FIG. 7, respectively. When the control flap 9 is positioned at the solid line position in FIG. 7, a maximum heating mode can be set for the rear area of the passenger compartment. Similarly, the control flap 9 can be moved to the chain line positions shown in FIG. 7.

In this embodiment, the wall portions of the housing 1 and the control flaps 20a, 20b and 21a, 21b together form a limiting wall of the main passage 2 in relation to the separate passage 2a, corresponding to the arc-shaped limiting wall in FIG. 1.

In the second embodiment, the two control flaps 20a and 20b (plate members) can also be arranged in a wall section which extends from a front end (upstream end) of the partition wall 7' at an angle to a wall of the housing, so that a limiting wall of the main passage 2 in relation to the first separate passage 2a is formed to correspond to the limiting wall shown in FIG. 1.

In this embodiment, for example, the maximum cooling mode can be set in the front and rear areas of the passenger compartment when the control flaps 20a, 20b and the control flaps 21a, 21b are positioned at the solid line positions and when the control flap 9 is moved to close the rear warm air port 8. Alternatively, the maximum heating mode can be set for front and rear areas of the passenger compartment.

Other Embodiments

Although the present invention has been described in connection with some preferred embodiments thereof with reference to the accompanying drawings, it is to be noted that various changes and modifications will become apparent to those skilled in the art.

For example, instead of the two control flaps 20a, 20b or the two control flaps 21a, 21b, a single control flap can be used. Furthermore, a member having a structure different from the control flap 9 can be used for opening and closing the rear warm air port 8.

While the invention has been described with reference to exemplary embodiments thereof, it is to be understood that the invention is not limited to the exemplary embodiments and constructions. The invention is intended to cover various modification and equivalent arrangements. In addition, while the various elements of the exemplary embodiments are shown in various combinations and configurations, which are exemplary, other combinations and configuration, including more, less or only a single element, are also within the spirit and scope of the invention.

What is claimed is:

1. An air conditioner for a vehicle comprising:
a housing for defining an air passage through which air flows, the air passage having a main passage and first and second separate passages branched from the main passage;
an evaporator, disposed in the main passage of the housing, for cooling air;
a heat exchanger for heating air, the heat exchanger being disposed in the main passage at a downstream air side of the evaporator in a part area of the main passage;
a control member which is provided to adjust an air flow from the evaporator into the first separate passage and an air flow from the heating heat exchanger into the first separate passage;
a limiting wall member extending from an upper end of the evaporator to a lower end of the heat exchanger approximately in an arc shape at a distance from the heat exchanger on a downstream air side of the heat exchanger, wherein:
the limiting wall member is separated from the lower end of the heat exchanger to have a rear opening between the lower end of the heat exchanger and the limiting wall member, through which air from the heat exchanger flows into the second separate passage leading to a rear area;
the limiting wall member is provided to partition the first separate passage from the main passage;
the control member is arranged in the limiting wall member;
a partition plate for partitioning the main passage into a cold air passage through which air from the evaporator flows to the first separate passage, and a warm air passage through which air from the heat exchanger flows;
the control member is a flexible sheet member at least partly defining a through hole;
the limiting wall member has a guide member for guiding the sheet member;
the partition plate extends from an end portion of the heat exchanger to a position immediately before the limiting wall member; and
the sheet member is displaceable along the limiting wall member in the guide member relative to the partition plate.

2. An air conditioner according to claim 1, wherein:
the sheet member is constructed with two sheet portions which are displaceable relative to one another; and
an open area of the through hole is adjustable by the two sheet portions.

3. An air conditioner according to claim 1, further comprising
a control flap arranged to open and close the rear opening, wherein the control flap adjusts a flow amount of air flowing from the heat exchanger into the second separate passage.

4. An air conditioner according to claim 1, wherein:
the control member includes at least one first control element which is arranged between an end of the heat exchanger and a limiting wall of the housing for adjusting an air amount flowing from the evaporator to the first separate passage, and at least one second control element arranged at a downstream air side of the heat exchanger for adjusting an air amount flowing from the heat exchanger to the first separate passage;
the heat exchanger is arranged to have a rear opening between a lower end of the heat exchanger and a wall portion of the housing; and
through the rear opening, air from the heat exchanger flows to the second separate passage.

5. An air conditioner according to claim 1, further comprising
a control flap disposed to open and close the rear opening.

6. The air conditioner according to claim 1, wherein:
the air conditioner is in combination with the vehicle;
the first separate passage is provided for leading air from the main passage to a front area of a passenger compartment of the vehicle; and
the second separate passage is provided for leading air from the main passage to a rear area of the passenger compartment of the vehicle.

7. An air conditioner according to claim 6, wherein:
the sheet member is constructed with two sheet portions which are displaceable relative to one another; and
an open area of the through hole is adjustable by the two sheet portions.

8. An air conditioner according to claim 6, further comprising
a control flap arranged to open and close the rear opening, wherein the control flap adjusts a flow amount of air flowing from the heat exchanger into the second separate passage.

9. An air conditioner according to claim 6, wherein:
the control member includes at least one first control element which is arranged between an end of the heat exchanger and a limiting wall of the housing for adjusting an air amount flowing from the evaporator to the first separate passage, and at least one second control element arranged at a downstream air side of the heat exchanger for adjusting an air amount flowing from the heat exchanger to the first separate passage;
the heat exchanger is arranged to have a rear opening between a lower end of the heat exchanger and a wall portion of the housing; and
through the rear opening, air from the heat exchanger flows to the second separate passage leading to the rear area of the passenger compartment.

10. An air conditioner according to claim 6, further comprising
a control flap disposed to open and close the rear opening.

11. An air conditioner for a vehicle comprising:
a housing for defining an air passage through which air flows, the air passage having a main passage and first and second separate passages branched from the main passage;
an evaporator, disposed in the main passage of the housing, for cooling air;
a heat exchanger for heating air, the heat exchanger being disposed in the main passage at a downstream air side of the evaporator in a part area of the main passage;
an opening portion provided in the housing, for mixing air from the evaporator and air from the heat exchanger, wherein the main passage communicates with the first separate passage through the opening portion;

temperature adjusting means for adjusting a temperature of air mixed in the opening portion by adjusting a first open area of the opening portion for passing air from the evaporator into the opening portion, and a second open area of the opening portion for passing air from the heating heat exchanger into the opening portion;

a limiting wall member extending from an upper end of the evaporator to a lower end of the heat exchanger approximately in an arc shape at a distance from the heat exchanger on a downstream air side of the heat exchanger, wherein:

the limiting wall member is separated from the lower end of the heat exchanger to have a rear opening between the lower end of the heat exchanger and the limiting wall member, through which air from the heat exchanger flows into the second separate passage leading to a rear area;

the limiting wall member is provided to partition the first separate passage from the main passage;

the control member is arranged in the limiting wall member;

a partition plate for partitioning the main passage into a cold air passage through which air from the evaporator flows to the first separate passage, and a warm air passage through which air from the heat exchanger flows;

the control member is a flexible sheet member at least partly defining said opening portion;

the limiting wall member has a guide member for guiding the sheet member;

the partition plate extends from an end portion of the heat exchanger to a position immediately before the limiting wall member; and the sheet member is displaceable along the limiting wall member in the guide member relative to the partition plate.

12. The air conditioner according to claim 11, wherein the temperature adjusting means is constructed with said partition plate extending from an end of the heat exchanger to a portion immediately before the limiting wall member, and a moving unit for moving the opening portion relative to the partition plate.

13. The air conditioner according to claim 12, further comprising
said sheet member provided to partition the first separate passage from the main passage, wherein the opening portion is provided in the sheet member.

14. The air conditioner according to claim 11, wherein:
the air conditioner is in combination with the vehicle;
the first separate passage is provided for leading air from the main passage to a front area of a passenger compartment of the vehicle; and
the second separate passage is provided for leading air from the main passage to a rear area of the passenger compartment of the vehicle.

15. The air conditioner according to claim 14, wherein the temperature adjusting means is constructed with said partition plate extending from an end of the heat exchanger to a portion immediately before the limiting wall member, and a moving unit for moving the opening portion relative to the partition plate.

16. The air conditioner according to claim 14, further comprising
said sheet member provided to partition the first separate passage from the main passage, wherein the opening portion is provided in the sheet member.

* * * * *

UNITED STATES PATENT AND TRADEMARK OFFICE
CERTIFICATE OF CORRECTION

PATENT NO. : 7,540,321 B2 Page 1 of 1
APPLICATION NO. : 11/147129
DATED : June 2, 2009
INVENTOR(S) : Wolfgang Simmet et al.

It is certified that error appears in the above-identified patent and that said Letters Patent is hereby corrected as shown below:

On Title Page, Item (30) Foreign Application Priority Data,
June 7, 2004 (DE) "10 2004 027 689" should be
-- 10 2004 027 689.7 --

Signed and Sealed this

Fourth Day of August, 2009

JOHN DOLL
*Acting Director of the United States Patent and Trademark Office*